June 28, 1966  C. H. PERKINS  3,257,852
GAGE CONSTRUCTION AND PARTS THEREFOR OR THE LIKE
Filed Feb. 11, 1963

INVENTOR.
CHARLES H. PERKINS
BY
Caudn & Caudn
HIS ATTORNEYS

United States Patent Office 3,257,852
Patented June 28, 1966

3,257,852
GAGE CONSTRUCTION AND PARTS THEREFOR
OR THE LIKE
Charles H. Perkins, Knoxville, Tenn., assignor to Robertshaw Controls Company, Richmond, Va., a corporation of Delaware
Filed Feb. 11, 1963, Ser. No. 257,423
4 Claims. (Cl. 73—414)

This invention relates to an improved gage construction, such as a pressure gage or the like, and to improved parts for such a gage construction or the like.

It is well known that pressure gages and the like include an actuating element, such as a Bourdon tube, bellows assembly or other similar element, which has an end or tip that moves upon changes in pressure or the like whereby the movement of the movable end of the actuating element is amplified by a suitable mechanical gear train or the like interconnected to a pointer carrying shaft so that the changes sensed by the actuating element can be visually determined by the location of the pointer relative to a suitable dial face.

However, such actuating elements involve the development of a relatively high order of energy change upon sudden application or release of pressure in the elastic chamber of the actuating element.

Gages not equipped with a dampening means for this rapid release or application of pressure in the elastic chamber of the actuating element whip the pointer mechanism to such an extent that the pointer may be bent or dislodged from the pointer shaft.

Therefore, various manufacturers have utilized dampening means for dampening rapid movement of the pointer shaft.

For example, one such dampening means is fully disclosed in the United States patent to Brown No. 2,701,968, wherein a viscous dampener is operatively interconnected to the pointer shaft to dampen rapid movement of the pointer shaft.

However, it has been found that when gages utilize such dampening means, a tremendous loading is imposed upon the bearings of the mechanical lever train or gear train interposed between the movable end of the actuating element and the pointer shaft.

In such mechanical gear trains, consisting of levers and gear members, the gear teeth are subjected to a considerable mechanical loading by virtue of the mechanical multiplication of the gear train and the accelerations imposed by the movable end of the elastic chamber when subjected to sudden increases or decreases of pressure.

It has been found that this loading is severe enough to rapidly wear out the bearings and permanently distort the gear train as well as sometimes dislodge the gear train mounting from the base of the gage.

However, according to the teachings of this invention, a resilient link is provided between the movable end of the actuating element of such a gage and the mechanical gear train thereof to substantially eliminate any adverse effects on the bearing means or gear train of the gage during sudden applications or releases of pressure in the elastic chamber of the actuating element.

For example, the use of the resilient link of this invention will limit the amount of force which may be transmitted from the movable end of the actuating element to the mechanical gear train. The resilient link can be designed to provide this force limiting function in either the increase in pressure situation or the decrease in pressure situation or in both cases, as desired.

Accordingly, it is an object of this invention to provide an improved gage construction or the like having one or more of the novel features of this invention as set forth above or hereinafter shown or described.

Another object of this invention is to provide an improved part for such a gage construction or the like.

Other objects, uses and advantages of this invention are apparent from a reading of this description which proceeds with reference to the accompanying drawings forming a part thereof and wherein.

Figure 1:
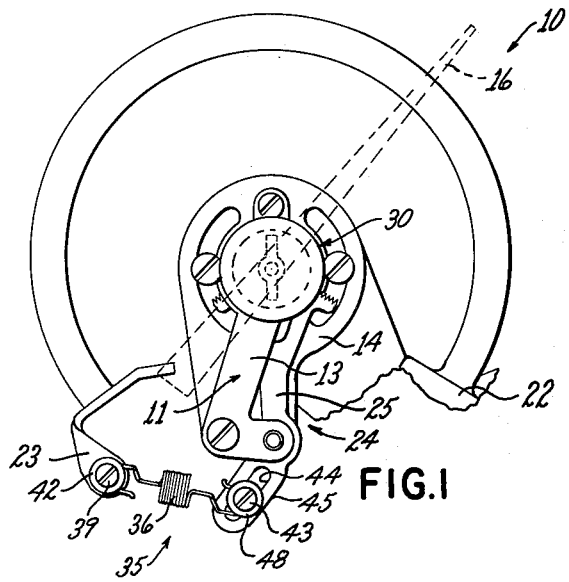
FIGURE 1 is a schematic broken away rear view of the improved gage construction of this invention.

While the various features of this invention are hereinafter described and illustrated as being particularly adaptable for pressure type gage constructions or the like, it is to be understood that the various features of this invention can be utilized singly or in any combination thereof to provide other constructions as desired.

Therefore, this invention is not to be limited to only the embodiments illustrated in the drawings, because the drawings are merely utilized to illustrate one of the wide variety of uses of this invention.

Figure 2:
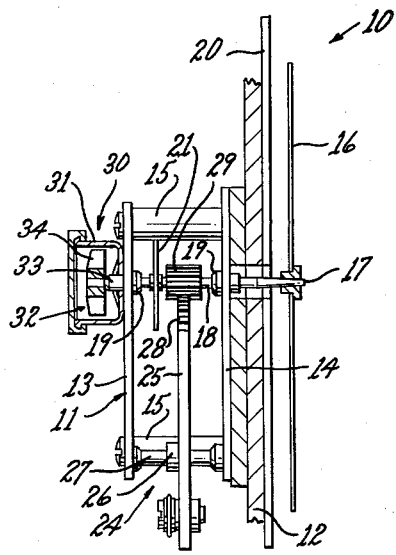
FIGURE 2 is a fragmentary broken away, partial cross-sectional view of the side of the gage construction illustrated in FIGURE 1.

Referring now to FIGURES 1 and 2, the improved pressure gage construction of this invention is generally indicated by the reference numeral 10 and comprises a base or support means 11 secured in the gage housing 12 in any suitable manner, the base 11 comprising a plurality of plates 13 and 14 suitably secured together in spaced relation by posts 15 or the like.

A pressure indicating pointer 16 is carried on the free end 17 of a shaft 18 journaled in suitable bearing means 19 carried by the support means 11 whereby the shaft 18 is adapted to be rotated relative to the base 11 in response to pressure changes in a manner hereinafter described to move the pointer 16 relative to a dial face 20 to indicate a pressure reading, the shaft 18 normally being urged in a direction to indicate a zero pressure reading by a hair spring 21 in a manner well known in the art.

An actuating element 22, such as a Bourdon tube, is carried by the gage 10 and has a movable end or tip 23, FIGURE 1, which moves in response to changes in pressure sensed by the actuating element 22. This movement of the end 23 of the actuating element 22 is indicated by the pointer 16 being correspondingly moved relative to the dial face 20. In order to amplify the movement of the end 23 of the actuating element 22 to the pointer 16, a mechanical gear train, generally indicated by the reference numeral 24, is provided between the movable end 23 of the actuating element 22 and the pointer shaft 18, such gear train or motion transmitting means 24 comprising a sector gear lever member 25 pivotally mounted in a bearing means 26 carried by a shaft 27 disposed between the base plates 11 and 14.

The sector gear lever 25 has a sector gear portion 28 disposed in meshing relation with a pinion gear 29 fixedly secured to the pointer shaft 18 whereby rocking movement of the lever 25 about the pivot shaft 27 causes rotary motion of the pointer shaft 18.

As previously set forth, the movement of the end 23 of the actuating element 22 involves the development of a relatively high order of energy change upon a sudden application or release of pressure in the elastic chamber of the actuating element 22 whereby dampening means must be provided to prevent whipping of the pointer mechanism during the sudden application or release of pressure to prevent the pointer 16 from being bent or dislodged from the pointer shaft 18.

One such means is illustrated in FIGURES 1 and 2 and comprises a viscous dampener 30 operatively interconnected to the pointer shaft 18.

In particular, a housing 31 is secured to the base plate 11 and has the cavity 32 thereof filled with a viscous fluid. The pointer shaft 18 has the end 33 thereof projecting into the cavity 32 and attached to a panel wheel 34 disposed in the viscous fluid.

Therefore, the viscous fluid in the chamber 32 acts to prevent rapid rotational movement of the paddle wheel 34 and, thus, rapid movement of the end 23 of the actuating element 22.

However, as previously set forth, it has been found that in mechanical gear trains, such as the gear train 24, the gear teeth thereof are subjected to a considerable mechanical loading by virtue of the mechanical multiplication of the gear train and the accelerations imposed by the movable end 23 of the actuating element 22 when subjected to sudden increases or decreases in pressure. From experience, it has been found that this loading is severe enough to rapidly wear out the bearings of the gage 10 and permanently distort the gear train 24 as well as to sometimes dislodge the gear train mounting from the base 11 of the gage 10.

This invention eliminates such disadvantages by providing a resilient link between the movable end 23 of the actuating element 22 and the gear train 24, such resilient link being generally indicated by the reference numeral 35 in FIGURE 1.

Figure 3:
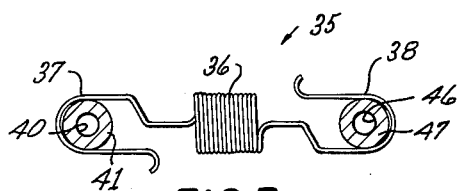
FIGURE 3 is a schematic cross-sectional view on an enlarged scale illustrating the resilient link of the gage construction of FIGURE 1.
Figure 4:
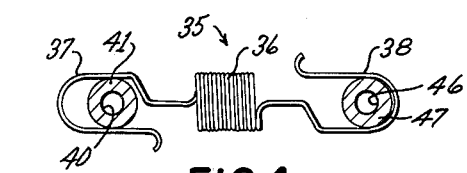
FIGURE 4 is a view similar to FIGURE 3 and illustrates the lost motion connection of the resilient link of FIGURE 3 with the movable end of the actuating element of the gage of FIGURE 1.

As illustrated in FIGURES 1, 3 and 4, the resilient link 35 comprises a helically wound tension spring 36 having the opposed ends 37 and 38 thereof formed in inwardly facing loops for a purpose now to be described.

A bolt 39 or the like is fixedly secured to the movable end 23 of the actuating element 22 and passes through a suitable bore 40 in a bearing element 41 disposed between the end 23 of the actuating element 22 and the enlarged head 42 of the bolt 39.

Similarly, a bolt 43 or the like is adjustably secured in an elongated slot 44 in the free end 45 of the lever arm 25 and passes through a bore 46 in a bearing element 47 disposed between the end 45 of the lever arm 25 and the enlarged head 48 of the bolt 43.

The resilient link 35 has the looped ends 37 and 38 thereof respectively disposed about the bearing means 41 and 47 in the manner illustrated in FIGURE 3 whereby the movable end 23 of the actuating element 22 is operatively interconnected to the mechanical gear train 24 of the gage 10.

Therefore, upon normal movement of the end 23 of the actuating element 22 in an increasing pressure direction, the movable end 23 of the actuating element 22 tends to move away from the end 45 of the lever 25 whereby the spring 36 transmits such movement to the gear train 24 to cause the pointer 16 to move in a corresponding pressure increasing direction. Similarly, a normal decrease in pressure causes the end 23 of the actuating element 22 to move toward the end 45 of the lever 25 whereby the hair spring 21 causes the lever 25 to move in unison with the end 23 of the actuating element 22 and cause the pointer 16 to indicate a corresponding decrease in pressure.

However, upon a rapid movement of the end 23 of the actuating element 22 in a pressure increasing direction, the end 23 of the actuating element 22 rapidly moves away from the end 45 of the lever 25 whereby the spring 36 of the resilient link 35 extends so that such rapid movement is not immediately transferred to the gear train 24 of the gage 10 to adversely affect the bearing means and gear train thereof as would be the case if the vibration dampener 30 were required to dampen such rapid movement of the lever 25. When the end 23 of the actuating element 22 comes to rest at its pressure increased position, the extended spring 36 of the resilient link 35, through the tension effect thereof, draws the end 45 of the lever 25 toward the end 23 of the actuating element 22 until the coils of the spring 36 are disposed against each other in the manner illustrated in FIGURE 1 whereby the pointer 16 will subsequently indicate the increased pressure.

Conversely, should the end 23 of the actuating element 22 rapidly move in a decrease in pressure direction, the end 23 of the actuating element 22 rapidly moves toward the end 45 of the lever 25. However, because of the lost motion connection between the bearing means 41 and the looped end 37 of the spring 36, the end 23 of the actuating element 22 is adapted to move relative to the spring 36 in the manner illustrated in FIGURE 4 whereby a lost motion is effected between the end 23 of the actuating element 22 and the resilient link 35 so that such a rapid movement in the pressure decreasing direction is not directly transmitted to the gear train 24 of the gage 10. When the end 23 of the actuating element 22 comes to rest in its new pressure decrease position, the hair spring 21 of the gage 10 causes the gear train 24 to follow such movement of the end 23 of the actuating element 22 at a rate which will not cause an adverse effect on the gage 10 in the above manner.

Therefore, it can be seen that an improved gage is provided by this invention wherein rapid movement of the movable end of the actuating element does not adversely affect the mechanical gear train or bearing means of the gage even though the pointer shaft of the gage has a viscous dampener or the like operatively connected thereto.

While one embodiment of the resilient link 35 is illustrated in FIGURES 1-4, it is to be understood that other resilient links of this invention can be utilized in the same manner as the link 35 to produce the desired functions of this invention as set forth above.

Figure 5:
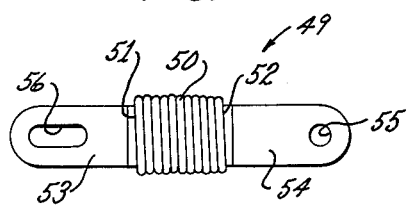
FIGURE 5 is a view similar to FIGURE 3 and illustrates another embodiment of the resilient link of this invention.

In particular, another resilient link of this invention is generally indicated by the reference numeral 49 in FIGURE 5 and comprises a helically wound tension spring 50 having the opposed ends 51 and 52 thereof respectively secured to a pair of flat links 53 and 54, the link 54 being adapted to be attached to the end 45 of the lever arm 25 of the gage 10 by the bolt 43 passing through an aperture 55 in the link 54. Similarly, the link 53 is adapted to be attached to the movable end 23 of the actuating element 22 of the gage 10 by the bolt 39 passing through an elongated slot 56 in the link 53, the elongated slot 56 providing a lost motion connection between the resilient link 49 and the end 23 of the actuating element 22 should the actuating element 22 be rapidly moved in a pressure decreasing direction. Conversely, the tension spring 50 provides a resilient means between the end 23 of the actuating element 22 and the end 45 of the lever 25 should there be a rapid movement of the end 23 of the actuating element 22 in a pressure increasing direction in the same manner as the tension spring 36 previously described.

Figure 7:
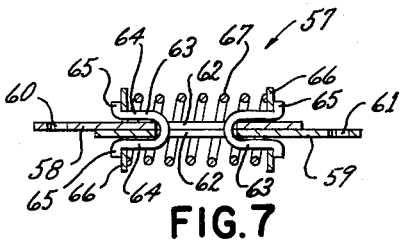
FIGURE 7 is a cross-sectional view taken on line 7—7 of FIGURE 6.
Figure 6:
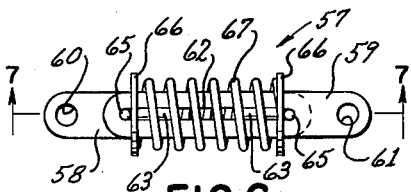
FIGURE 6 is a view similar to FIGURE 5 and illustrates another embodiment of the resilient link of this invention.

Another resilient link of this invention is generally indicated by the reference numeral 57 in FIGURES 6 and 7 and adapted to be utilized to interconnect the movable end 23 of the actuating element 22 of the gage 10 with the end 45 of the lever arm 25 to produce the novel functions of this invention.

As illustrated in FIGURES 6 and 7, the resilient link 57 comprises a pair of links 58 and 59 respectively being adapted to be interconnected to the movable end 23 of the actuating element 22 and to the end 45 of the lever arm 25 by the bolts 39 and 43 respectively passing through suitable apertures 60 and 61 in the links 58 and 59.

The links 58 and 59 are disposed in overlapping relation as illustrated in FIGURES 6 and 7 and respectively have elongated slots 62 passing therethrough and aligned with each other.

A pair of U-shaped pins 63 are respectively disposed in the aligned slots 62 at the ends thereof and have legs 64 thereof disposed on opposite sides of the overlapping portions of the links 58 and 59, each leg 64 having an outwardly turned end 65 for a purpose now to be described.

A pair of washer-like retainers 66 are respectively disposed over the U-shaped pins 63 and abut against the outwardly turned ends 65 thereof as illustrated in FIGURE 7.

A compression spring 67 is disposed between the retainers 66 and urge the same into engagement with the turned ends 65 of the pins 63 whereby the compression spring 67 tends to maintain the links 58 and 59 in the position illustrated in FIGURE 7.

When such a resilient link 57 of this invention is utilized between the movable end 23 of the actuating element 22 of the gage 10 and the end 45 of the lever arm 25, the resilient link 57 functions in the following manner.

Should the end 23 of the actuating element 22 rapidly move in a pressure increasing direction, i.e., in a direction away from the end 45 of the lever arm 25, the link 58 as illustrated in FIGURE 7 is rapidly moved to the left whereby the same carries the right hand pin 63 and right hand washer 66 therewith to compress the spring 67 so that the link 59 can remain substantially stationary. In this manner, rapid movement of the end 23 of the actuating element 22 will not be transmitted to the gear train 24 of the gage 10. However, when the end 23 has stopped in its new pressure increased direction, the compressed spring 67 urges the left hand pin 65 and its associated retainer 66 to the left to cause the link 59 to move to the left under the force of the compression spring 67 so that the gear train 24 will cause the pointer 16 to move to the new pressure reading position thereof.

Conversely, if the end 23 of the actuating element 22 rapidly moves in a direction toward the end 45 of the lever arm 25 upon a rapid decrease in pressure, the link 58 illustrated in FIGURE 7 is rapidly moved to the right and carries the left hand pin 63 and left hand retainer 66 therewith to compress the spring 67 whereby the link 59 can remain substantially stationary so that such rapid movement will not be transmitted to the gear train 24 of the gage 10. However, when the end 23 of the actuating element 22 has reached its new position, the compressed spring 67 acts against the right hand pin 63 and right hand retainer 66 to move the link 59 to the right so that the gear train 24 will move the pointer 16 to its lower pressure indicating position.

In this manner, the spring 67 is compressed regardless of the direction of rapid movement of the end 23 of the actuating element 22 to prevent adverse effects on the gage 10 as would be provided if a rigid member interconnected the end 23 of the actuating element 22 of the end 45 of the lever arm 25 as in the past.

It is well known that Bourdon tube pressure gages act as a spring-mass system. Thus, when the actuating element 22 of the gage 10 is subjected to rapidly oscillating pressures, the movable end 23 of the actuating element 22 will deflect a greater amount than would normally occur if the pressure variations were of low frequency. However, by adjusting the initial tension or bias load of the resilient links of this invention, the indicated pressure will more nearly approximate the true pressure conditions.

Therefore, it can be seen that this invention provides an improved gage construction or the like as well as an improved part for such a gage construction or the like.

While the form of the invention now preferred has been disclosed as required by the statutes, other forms may be used, all coming within the scope of the claims which follow.

What is claimed is:

1. A gage or the like comprising support means having a plurality of bearing means, a shaft rotatably mounted in some of said bearing means and carrying a pointer, a viscous dampener carried by said support means and operatively interconnected to said shaft to dampen movement thereof, an actuating element carried by said support means and having a movable end, a mechanical gear train carried by other of said bearing means and operatively interconnected to said shaft, and resilient means interconnecting said end of said actuating element to said mechanical gear train, said resilient means minimizing the effect of rapid movement of said one of said actuating element in at least one direction that would be adversely imposed on said bearing means by rapid movement of said mechanical gear train, said resilient means including a helically wound tension spring having looped ends, one of said looped ends being interconnected to said end of said actuating element and providing a lost motion connection therewith when said end of said actuating element moves in a direction to compress said spring, the other looped end of said spring being interconnected to said mechanical gear train.

2. A gage or the like comprising support means having a plurality of bearing means, a shaft rotatably mounted in some of said bearing means and carrying a pointer, a viscous dampener carried by said support means and operatively interconnected to said shaft to dampen movement thereof, an actuating element carried by said support means and having a movable end, a mechanical gear train carried by other of said bearing means and operatively interconneced to said shaft, and resilient means interconnecting said one of said actuating element to said mechanical gear train, said resilient means minimizing the effect of rapid movement of said end of said actuating element in at least one direction that would be adversely imposed on said bearing means by rapid movement of said mechanically gear train, said resilient means including a helically wound tension spring having the opposed ends thereof connected to a pair of links, one of said links being interconnected to said end of said actuating element and providing a lost motion connection therewith when said end of said actuating element moves in a direction to compress said spring, the other link being interconnected to said mechanical gear train.

3. A gage or the like comprising support means, a pointer rotatably mounted to said support means, a viscous dampener carried by said support means and operatively interconnected to said pointer to dampen movement thereof, an actuating element carried by said support means and having a movable end, motion transmitting means carried by said support means and operatively interconnected to said pointer, and resilient means interconnecting said end of said actuating element to said motion transmitting means, said resilient means minimizing the effect of rapid movement of said end of said actuating element in at least one direction that would be adversely imposed on said motion transmitting means, said resilient means comprising a helically wound tension spring having ends respectively interconnected to said motion transmitting means and to said end of said actuating element, one of said ends of said tension spring having a loop that provides a lost motion connection with said end of said actuating element when said end of said actuating element moves in a direction to compress said spring.

4. A gage or the like comprising support means, a pointer rotatably mounted to said support means, a viscous dampener carried by said support means and operatively interconnected to said pointer to dampen movement thereof, an actuating element carried by said support means and having a movable end, motion transmitting means carried by said support means and operatively interconnected to said pointer, and resilient means interconnecting said end of said actuating element to said motion transmitting means, said resilient means minimizing the effect of rapid movement of said end of said actuating element in at least one direction that would be adversely imposed on said motion transmitting means, said resilient means comprising a helically wound tension spring having the ends thereof respectively secured to links operatively and respectively connected to said motion transmitting means and said end of said actuating element, one end of said links providing a lost motion connection with said end of said actuating element when said end of said actuating element moves in a direction to compress said spring.

References Cited by the Examiner

UNITED STATES PATENTS

| | | | |
|---|---|---|---|
| 1,494,496 | 5/1924 | Manning | 73—414 |
| 1,552,886 | 9/1925 | Shultz | 74—582 |
| 2,178,538 | 11/1939 | Erbguth | 74—582 |
| 2,701,968 | 2/1955 | Brown | 73—414 |
| 3,078,738 | 2/1963 | Siegel | 74—582 X |
| 3,161,059 | 12/1964 | Burggren | 73—398 |

FOREIGN PATENTS 681,521   2/1930   France.

DAVID SCHONBERG, *Acting Primary Examiner.*

JOSEPH P. STRIZAK, RICHARD QUEISSER,
*Examiners.*

LOUIS R. PRINCE, LOUIS MOK, MICHAEL B. HEPPS, *Assistant Examiners.*